G. SIMPSON AND J. R. GORDON.
SHIP'S CONSTRUCTION AND METHOD OF DISPOSING PROPELLING MACHINERY THEREIN.
APPLICATION FILED APR. 26, 1920.
1,355,513.
Patented Oct. 12, 1920.
6 SHEETS—SHEET 1.
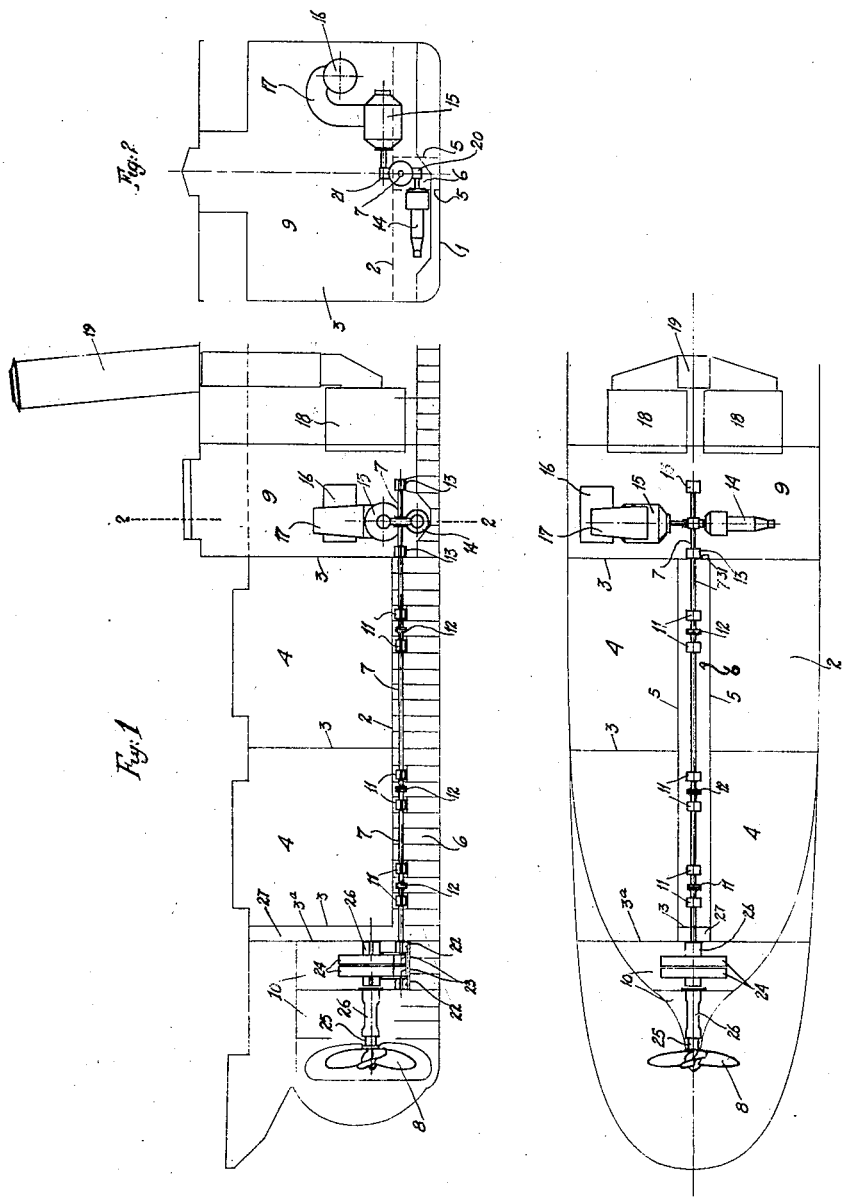
INVENTORS:
George Simpson &
Johnston R. Gordon.
BY
Geo. M. Chapman,
ATTORNEY.

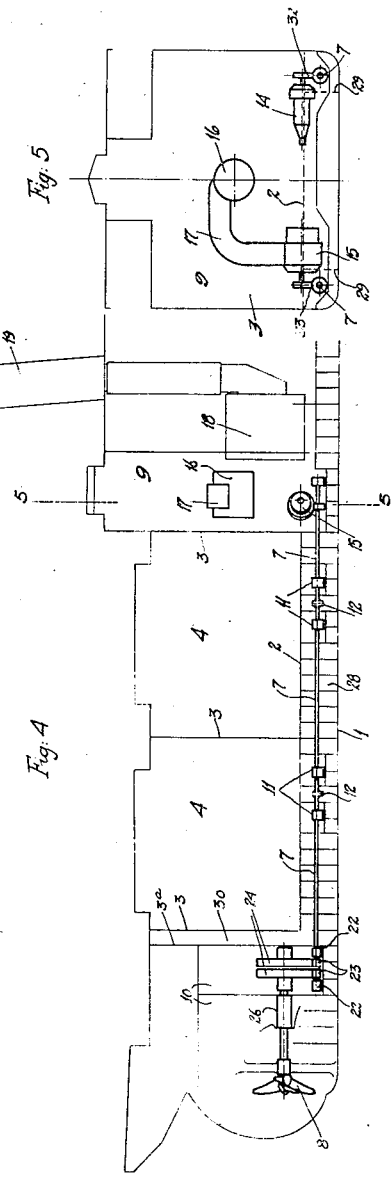

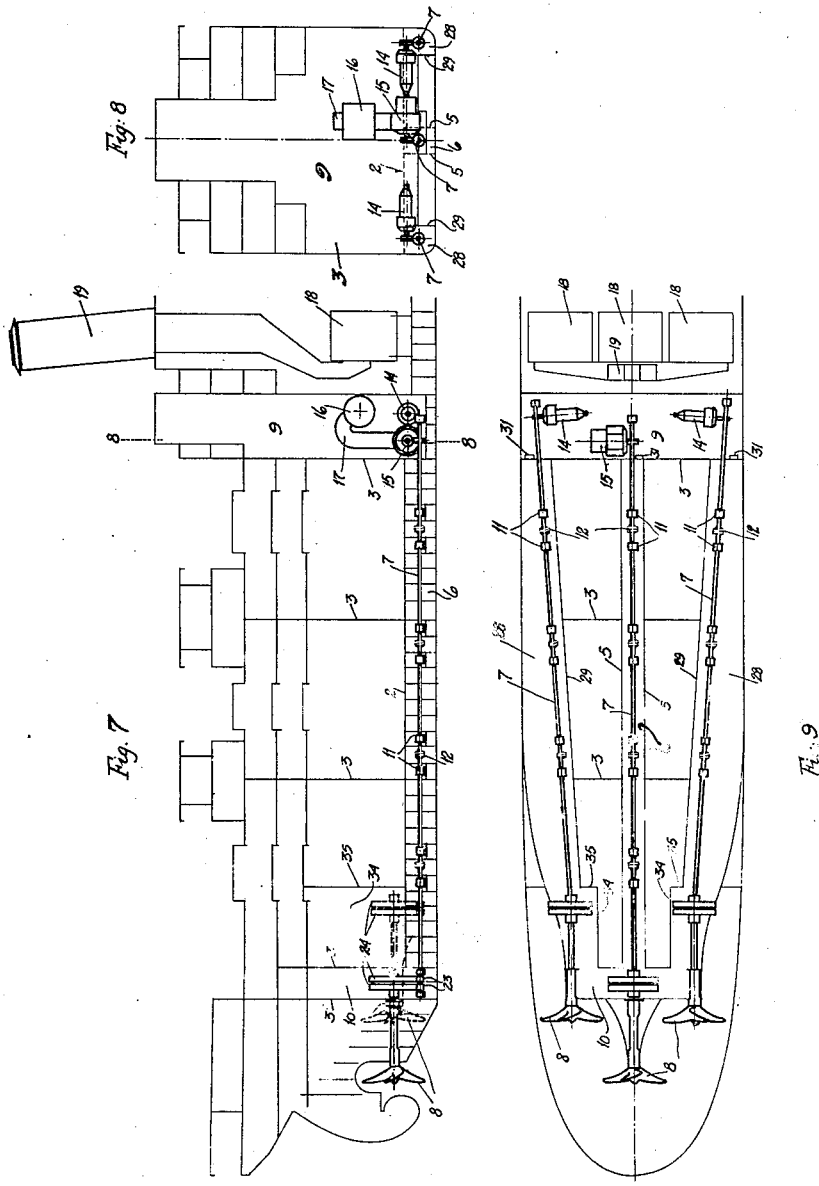

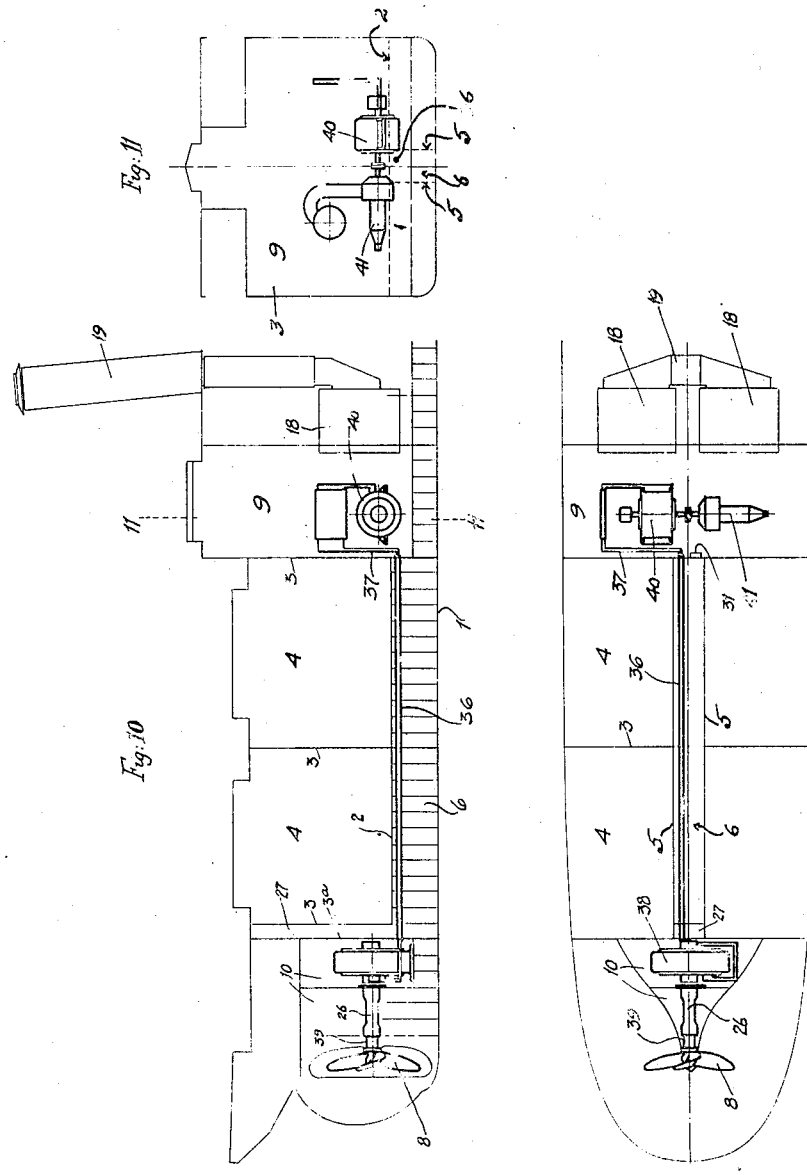

G. SIMPSON AND J. R. GORDON.
SHIP'S CONSTRUCTION AND METHOD OF DISPOSING PROPELLING MACHINERY THEREIN.
APPLICATION FILED APR. 26, 1920.
1,355,513. Patented Oct. 12, 1920.
6 SHEETS—SHEET 5.
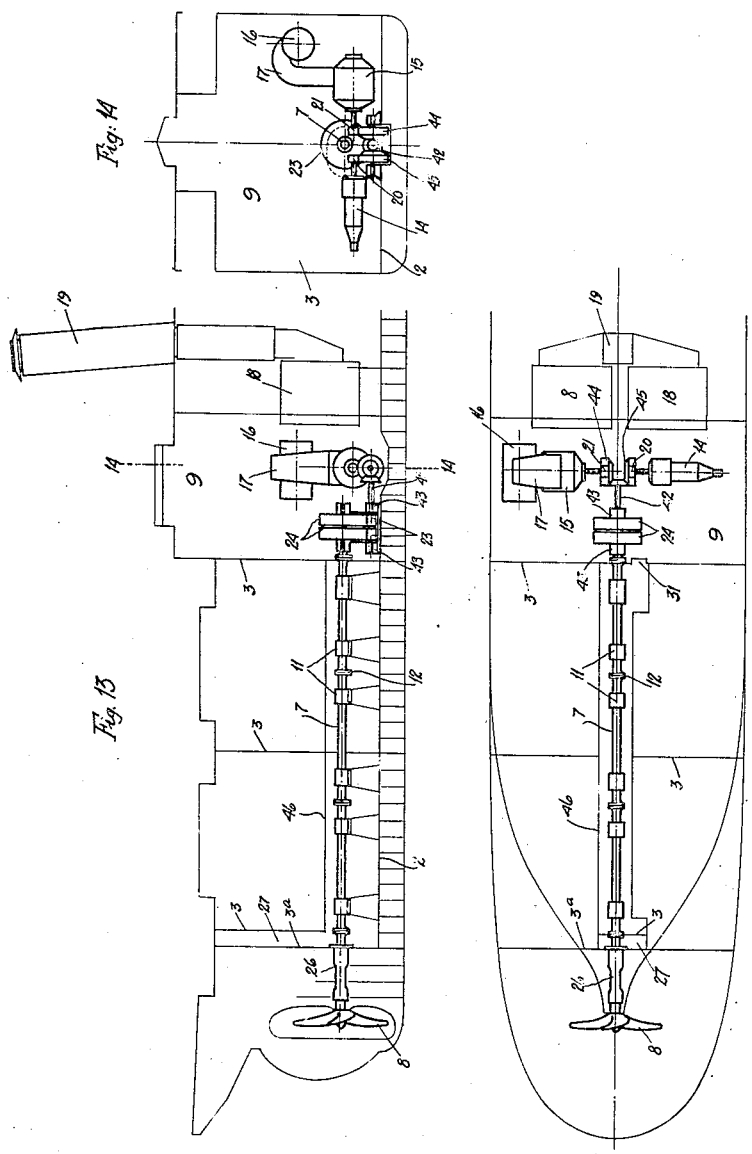
INVENTORS:
George Simpson
Johnston R. Gordon
BY
Chas. M. Chapman,
ATTORNEY.

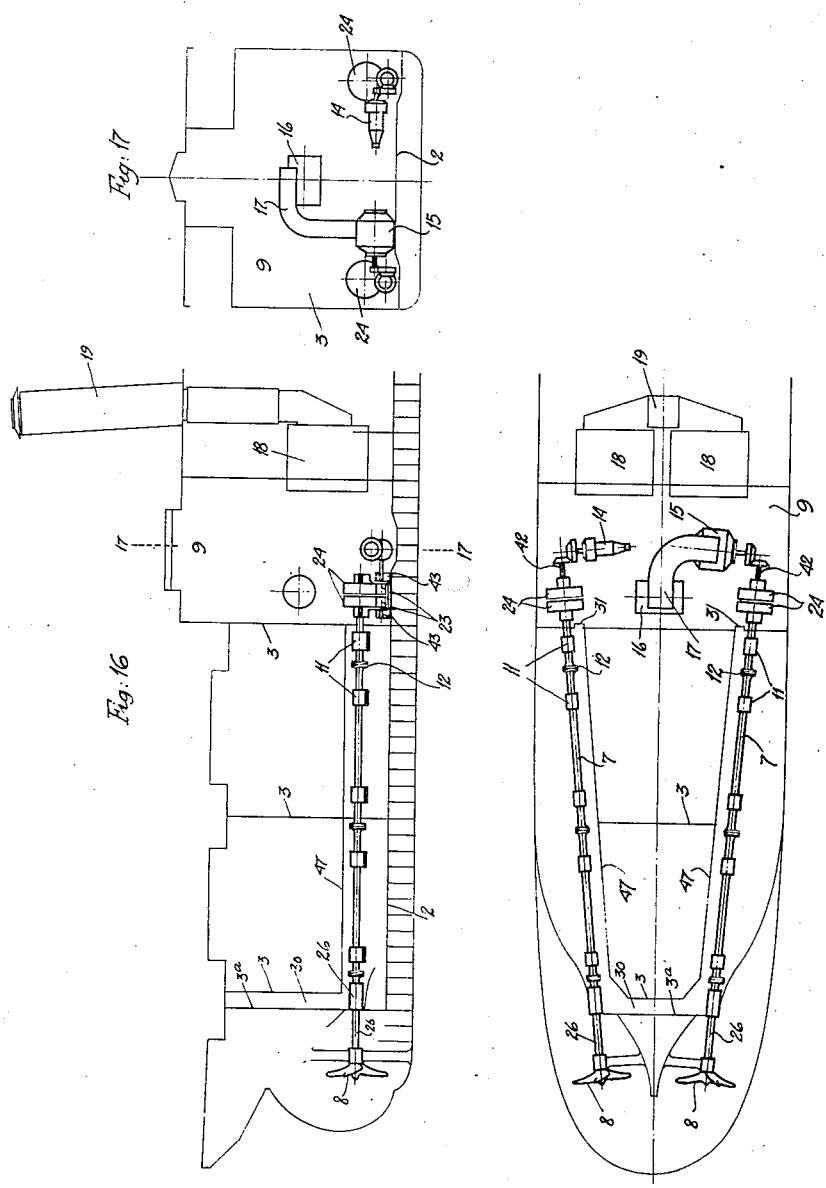

UNITED STATES PATENT OFFICE.

GEORGE SIMPSON, OF RICHMOND, AND JOHNSTON R. GORDON, OF NEW YORK, N. Y., ASSIGNORS TO SIMPSON-GORDON PATENTS, INC., OF NEW YORK, N. Y., A CORPORATION OF NEW YORK.

SHIP'S CONSTRUCTION AND METHOD OF DISPOSING PROPELLING MACHINERY THEREIN.

1,355,513.          Specification of Letters Patent.      Patented Oct. 12, 1920.

Application filed April 26, 1920. Serial No. 376,582.

*To all whom it may concern:*

Be it known that we, GEORGE SIMPSON and JOHNSTON R. GORDON, both citizens of the United States, residing in the borough of Richmond, county of Richmond, and State of New York, and borough of Manhattan, city, county, and State of New York, respectively, have invented certain new and useful Improvements in Ships' Construction and Methods of Disposing Propelling Machinery Therein, of which the following is a specification.

This invention relates to ships' construction and, particularly, has reference to the method or system of means for economizing space and for the disposition of the motive power and driving machinery for one or more propellers, and to the construction of the ship in matters of detail enabling the methodical disposition of the motive power and driving machinery referred to.

Among the objects of our invention may be noted the following: to so construct the ship that one or more trains of propelling shafting and driving gearing may be disposed along the longitudinal center of the vessel and at opposite sides thereof in wing alleys, or alleys arranged adjacent the bilge of the vessel, below the normal hold bottom of the vessel or floor of the hold thereof; to provide for the foregoing arrangement so as to eliminate all constructional features which would normally project into the hold of the vessel and thus avoid obstructions to stowage, injury to cargo, and injury to vessel; to provide the foregoing structural features and avoid the foregoing objectionable features with a view of increasing the cubic stowage capacity in cargo-carrying vessels, and at the same time saving structural weight to permit of the economical use of the resulting cubic capacity; to avoid building into the hold of the vessel, above the normal hold bottom thereof, shaft tunnels, raised construction for shafting, etc., and, at the same time, provide for the economical and effective disposition of the shafting and trains of driving mechanism beneath the bottom of the cargo holds, either along the longitudinal center thereof, or keel of the vessel, or along the bilge of the vessel, or portions adjacent thereto, according to whether the vessel be propelled by a single screw, twin screws, triple or quadruple screws or propellers; to economize in the structural steel employed in the vessel by eliminating the ordinary alleys, tunnels, trunks or other projections into the hold, thus materially simplifying the construction of the vessel, and reducing the cost of the same, as well as its total weight; to bring about great economy and saving in the line of transmitting shafting and gearing by being able to reduce the diameter of the shafting without detracting from the strength, driving and speed capacity of said shafting; to provide for the reduction in diameter of the transmission shafting and gearing, thus economizing weight, cost of material and maintenance, while being able to employ very powerful screws or propellers and very strong shafting therefor with economically disposed bearings; to provide for the installation of the prime movers or power machinery for the propellers and shafting in such manner as to save approximately 60% of the engine room length for a given HP., that is, by disposing the turbines or other engines athwartships in the machinery spaces, or at an angle to the transmission means, instead of fore and aft of the vessel, as has been usual, this method of disposing the power elements enabling direct, strong and positive drive of the train of gearing to the propellers, regardless of the character of the motive power or the number of propellers employed; and to provide for the concentration of all the machinery possible in the machinery space, or engine room, of the ship which space shall be reduced to a minimum, considering the machinery installed therein, the latter to include the power machinery or engines and the transmission gearing when desired, the method or system by which such machinery and gearing is disposed being of prime importance.

With the foregoing objects in view and others which will be detailed during the course of this description, our invention consists in the parts, features, elements and combinations thereof, together with the method of disposing the motive power in the vessel, as hereinafter described and claimed.

In order that our invention may be clearly understood, we have provided drawings wherein:

Figure 1 illustrates conventionally, or in outline, a well-known type of cargo-carrying vessel, the latter being shown from the machinery space aft of the vessel, the same showing one form of our invention, wherein a single-screw propeller and driving machinery therefor are embodied.

Fig. 2 is a transverse section of the vessel of Fig. 1 taken substantially on the line 2—2 of Fig. 1;

Fig. 3 is a hold plan of the vessel shown in Fig. 1;

Fig. 4 illustrates conventionally, or in outline, a well-known type of cargo-carrying vessel, the latter being shown from the machinery space aft of the vessel, the same showing another form of our invention, wherein are embodied twin-screws and their driving machinery, the shafting being extended fore and aft of the vessel near the bilge;

Fig. 5 is a transverse section of the vessel of Fig. 4 taken substantially on the line 5—5 of Fig. 4;

Fig. 6 is a hold plan of the vessel shown in Fig. 4;

Fig. 7 illustrates conventionally, or in outline, another type of vessel, the latter being shown from the machinery space aft of the vessel, the same showing another form of our invention wherein triple-screws or propellers and driving shafting and machinery are shown, the arrangement of the driving machinery being symmetrical, with the center train of shafting extending along the center line of the vessel, as in Fig. 1, and the port and starboard train of shafting being disposed substantially as shown in Fig. 4;

Fig. 8 is a transverse section of the vessel of Fig. 7 taken substantially on the line 8—8 of Fig. 7;

Fig. 9 is a hold plan of the vessel shown in Fig. 7;

Fig. 10 illustrates conventionally, or in outline, a cargo-carrying vessel of the type shown in Fig. 1, the latter being shown from the machinery space aft of the vessel, the same embodying a form of our invention wherein the propeller or screw is driven electrically, as distinguished from the mechanical drive illustrated in the preceding figures;

Fig. 11 is a transverse section substantially on the line 11—11 of Fig. 10;

Fig. 12 is a hold plan of the vessel shown in Fig. 10;

Fig. 13 illustrates conventionally, or in outline, a cargo-carrying vessel of the type shown in Fig. 1, the latter being shown from the machinery space aft of the vessel, the same embodying a form of our invention wherein the propeller or screw is connected directly to the shafting and directly driven thereby, and wherein the gearing is located in the machinery space and interposed between the power machinery and the shafting;

Fig. 14 is a transverse section substantially on the line 14—14 of Fig. 13;

Fig. 15 is a hold plan of the vessel shown in Fig. 13;

Fig. 16 illustrates conventionally, or in outline, a cargo-carrying vessel of the type shown in Fig. 4, the latter being shown from the machinery space aft of the vessel, the same embodying a form of our invention wherein twin-screws and their driving machinery are shown, the shafting being extended fore and aft of the vessel near the bilge, and the gearing being located in the machinery space and interposed between the shafting and the power machinery, the same as in Figs. 13 to 15;

Fig. 17 is a transverse section substantially on the line 17—17 of Fig. 16; and

Fig. 18 is a hold plan of the vessel shown in Fig. 16.

Referring to the drawings, it will be understood that no attempt has been made to show details of construction of the vessel not pertaining to our invention; but, simply to outline a usual type of vessel and its conventional parts sufficiently to enable one skilled in the art to readily understand the same. Moreover, instead of showing those portions of our invention in dotted lines where they extend under flooring or behind other parts of the vessel, such portions are shown in full line in order to bring out clearly and prominently the features of our invention upon which the present application is based. By this method we have accentuated our invention and minimized ordinary structural features of the vessels in which the different forms of our invention are embodied. Moreover, in the following description and claims, we have referred generally to "power machinery," meaning any form of driving or motive power for driving the shafting and transmission means or gearing; and we have also referred to the "transmission means," meaning any form of connection or shafting and gearing between the "power machinery" and propellers, which may be required or necessitated by the form or type of said "power machinery;" but; in claims where it is desired to distinguish between the "gearing" and the "shafting," such selective terms will be used.

Referring particularly, to Figs. 1, 2 and 3, wherein a cargo-carrying vessel of the single-screw type is illustrated, the numeral 1 indicates the outer shell bottom of the vessel, 2 the normal hold or inner bottom of the vessel which is merely shown in dotted lines, Fig. 2, for the purpose of indicating location relatively to the other parts of the vessel, and 3 bulkheads dividing the hold of the vessel into hold compartments 4, as usual. These bulkheads may be watertight or oiltight and are disposed where desired to divide the hold of the vessel into storage compartments, machinery spaces, etc. As will be seen upon inspection of Figs. 1, 2 and 3, the hold compartments are free and unobstructed throughout and the hold bottom or floor is devoid of projections, tunnels, or similar framings usually found therein, in which shafting, conduits and other necessary mechanical features of the vessel are conducted. Beneath the hold flooring 2, in this form of our invention, is provided a center line space, said space being produced by port and starboard fore and aft girders indicated by 5 and forming an alley 6 beneath the normal hold floor 2, in which alley extends the shafting 7 constituting a portion of the "transmission means" for the propeller 8. Within the alley 6, which extends from the engine and machinery space 9 to the after peak 10, a series of bearings 11 are provided for the shafting 7, and between the members of each series of bearings a coupling 12 is provided for the shaft sections. The bearings for the shafting may be as numerous as found necessary, and other bearings, such as 13, may be provided in the machinery and other spaces. The engine and machinery space 9 referred to, may be the engine and boiler room, or space, or it may be a special, comparatively small space extending athwartships for the installation or disposition of our "power machinery," our invention requiring a comparatively small space only for the purpose, resulting in materially increasing the hold capacity and cubic carrying capacity of the vessel. The after peak 10 referred to may be literally that part of certain types of vessels; but, according to our invention, the propeller shaft is extended forwardly and made to terminate in a convenient compartment where the driving gearing is readily accessible for inspection, repairs, etc. Hence, we do not desire to be understood as restricting our invention to the "after peak."

The "power machinery" may be of any form desired, viz., one or more turbines, electrical motors, hydraulic, gasolene, oil or other general types of engines, and may be of the rotary or reciprocating types. In the figures under consideration, 14 indicates conventionally a high pressure turbine, 15 a low pressure turbine, 16 the condenser, 17 the exhaust for the low pressure turbine, 18 the boilers, and 19 the smokestack. As shown in Figs. 1 and 2, the high pressure turbine 14 is arranged at a lower level than the low pressure turbine 15; but, according to our invention, both these turbines are arranged transversely of the engine room 9 or athwartships, as distinguished from the usual way of disposing such engines, viz., fore and aft of the vessel. In this way, great economy and saving of space is brought about in the engine and machinery space of the vessel, together with increase in hold capacity and cubic carrying capacity of the vessel. This will be readily understood upon viewing Figs. 1 and 3. The high pressure turbine 14 is geared, as at 20, to the driving shaft 7 from below, while the low pressure turbine is geared to said shaft 7 from above, as indicated at 21. Thus economy in disposition of driving mechanism is brought about, since direct drive from each of the turbines to the power transmission shaft is provided for, and this without changing the normal line or plane of disposition of the driving shaft 7. In other words, the high pressure turbine 14 is below the line of shafting 7 and is geared up to it, while the low pressure turbine 15 is above the line of shafting 7 and geared down to it. At the stern of the vessel the transmission shaft 7 is extended into the after peak 10 where bearings 22 are provided therefor, and on the after peak section of the driving shaft pinions 23 are provided which mesh with gears 24 carried by the propeller shaft 25, which extends through the usual stern tube and other bearings 26. Thus high speed imparted to the shafting 7 may be geared down at 23—24 so as to give to the propeller any revolutions per minute desired. Furthermore, this provides for a direct and economical drive of the propeller from the low and high pressure turbines; enables the shafting to be reduced to a minimum diameter consistent with strength, thus saving in material; enables the propeller shaft to be made as strong and stocky as may be required consistent with the work done by the propeller, thus adding strength without increasing the size of the shafting; and it will be apparent that, with this arrangement, the propeller and its shafting are independent of the transmission means and that any accident to the latter does not involve the propeller and its shaft, and vice versa.

The structure of the ship, to enable the foregoing improvements to be carried out, is modified to the extent that the alley 6, in which the shafting 7 and its bearings are housed and conducted from the machinery space 9 to the after peak 10, is entirely below the inner bottom or normal hold bottom of the vessel and yet is of sufficient size to permit inspection and repairs as usual; and an after peak bulkhead 3ª is arranged opposite the aftermost hold bulkhead 3, providing a space 27, in continuity with the alley 6, for exit and entrance of the engineer, which space may be a ladder trunk, or, in the space a ladder may be provided for ingress or egress. This feature is set forth in one of our concurrently pending applications.

In Figs. 4 to 6, inclusive, our invention is shown embodied in a twin-screw vessel, and all the similar parts shown in Fig. 1 to 3, inclusive, are indicated in Figs. 4 to 6, inclusive, by identical reference characters. It will, therefore, be unnecessary to describe in detail, by reference to the characters, the various similar features of construction which are shown therein. It will be sufficient, for the purposes of this form of our invention, to state that the transmission shafting 7 with bearings 11 and couplings 12, instead of being arranged in a longitudinal center line alley fore and aft below the hold bottom 2, are arranged below the normal bottom or hold bottom 2 of the vessel in wing or bilge alleys indicated generally by 28, which extend from the machinery space or engine room 9 aft to the after peak 10, said wing alleys being formed by inboard partitions, girders, or bulkheads 29 extending abaft the engine room 9 of the vessel and inclosing, in combination with the normal flooring or hold bottom 2 of the vessel, a space in which the shafting 7, bearings 11 and couplings 12 are all properly located and disposed, and through the medium of which alleys inspection of the various parts may be readily carried out. The wing alleys 28, at their after terminals, are joined by cross passage 30, which connects the two wing alleys and renders it unnecessary for the engineer to retrace his steps in order to pass from one alley to the other. This cross passage 30 also provides a ventilation and escape means, which is also true of the space 27, in Figs. 1 to 3, inclusive, and enables a ladder trunk or ladder to be raised therein for ingress and egress of the engineer when desired, or escape in case of danger. Moreover, manholes or sliding watertight doors 31 may be provided at the forward end of the wing alleys for ingress and egress of the engineer and as a matter of convenience, as well as safety should anything demand their use. A similar medium 31 is provided at the forward end of alley 6, in the form of invention of Figs. 1 to 3, see Fig. 2. In this form of our invention the gearing of the train of shafting 7 to the propeller shafts may be substantially the same as that shown in Figs. 1 to 3, inclusive, the only difference being that the lines of shafting are at an angle or offset relatively to the propeller shafts, instead of being parallel therewith, as in Figs. 1 to 3. The high pressure turbine 14, in this form of our invention may be arranged on the starboard, or vice versa, side of the vessel and is geared to the shafting 7 from above, as indicated at 32, while the low pressure turbine 15 may be arranged on the port, or vice versa, side of the vessel and is likewise geared to the transmission shafting 7 from above as indicated at 33. Thus the two engines, whatever may be their form, are arranged in substantially the same horizontal plane, with reference to the transmission shafting 7, and are geared to said shafting from above in substantially identical manner, and are arranged substantially in the same horizontal plane as the normal bottom or hold bottom 2 of the vessel. As shown, the two turbines or other engines are arranged obliquely in the engine room or machinery space, so as to have their driving shafts at an exact right-angle to the transmission shafts. In other details, such as the arrangement of the boilers, smokestacks, eduction pipe and condenser, this form of our invention is the same as that shown in Figs. 1 to 3, inclusive.

In Figs. 7, 8 and 9, our invention is shown embodied in a triple-screw vessel, and this form embodies a combination of the inventive ideas of means and methodical disposition of machinery shown in Figs. 1 to 6, inclusive. Therefore, all the like parts will be indicated by similar reference characters as in the preceding six figures. In this form of our invention the central transmission shafting 7 extends along the center line of the vessel in an alley 6, as shown in Fig. 2, below the normal hold bottom 2, while the port and starboard transmission shafting extend in wing alleys 28, below the normal hold bottom 2, as shown in Fig. 5. The bearings, couplings, etc., are all the same as in the other forms of our invention, and the gearing of the shafting to the respective propeller gears and shafts is the same as in the preceding forms of our invention. The high pressure turbines 14 are arranged to drive the port and starboard shafting and are geared thereto from above as in Figs. 4 to 6, inclusive, while a low pressure turbine 15 is arranged to drive the center line shafting and is geared thereto from above the same, as shown in Figs. 1 to 3, inclusive. The three turbines in the engine space 9, as shown in Figs. 7 to 9, inclusive, are arranged in staggered relation; that is to say, the low pressure turbine 15 is arranged directly athwartships, while the high pressure turbines are arranged obliquely athwartships and at right-angles to the transmission shafts 7. The wing alleys for the port and starboard shafting extend to the after peak 10, or adjacent space, where the gearing and bearings therefor for the center line propeller are located. The juncture of the two wing alleys 28 with the after peak or cross passage 10, is formed by fore and aft partitions 34, in turn connected to the fore and aft inboard sides of the wing alleys by partitions 35. Thus a chamber is provided in which are disposed the gearing and propeller shafting of the port and starboard propellers, respectively, and at which points the gearing connect with the port and starboard transmission shafting. The wing alleys 28 extend, therefore, from the engine or machinery space 9 on both port and starboard sides of the vessel, aft to the after peak or chamber 10, and said alleys are connected by the compartment or space forming part of the after peak. Hence, continuity of inspection of all the shafting and gearing can be carried out by the engineers without leaving any of the alleys, and especially as the center alley 6 is connected to the cross passage or after peak chamber 10 between the wing alleys. Watertight doors 31 are also provided in the engine or machinery space 9 for admission to the several alleys in this form of our invention the same as in Figs. 1 to 6, inclusive. The passage 10 is the escape and ventilation means the same as in the other forms of our invention.

In Figs. 10 to 12, inclusive, a form of vessel is shown which is substantially identical with that of Figs. 1 to 3, inclusive. In this form our invention, however, the drive for the propeller is electrical. In these latter figures, the center line alley 6 is shown as provided with a conduit 36, in which electric cables or mains 37 are incased and by means of which conduit the cables are led to a motor 38 at the stern of the vessel, the drive shaft of which is, or may be, the propeller shaft 39. The motor is installed in the after peak 10 and is driven by a generator 40 arranged in the engine space 9 with its axis arranged athwartship, vertically or fore and aft of the vessel. This generating set may be installed either above, below or alongside of the boilers. Coupled with the generator is a motor, turbine or other engine 41. All other parts of the vessel, and the location of the same, are the same in Figs. 10 to 12, inclusive, as in Figs. 1 to 3, inclusive.

In Figs. 13 to 15, inclusive, a form of vessel is shown which is substantially identical with that of Figs. 1 to 3, inclusive. In this form of our invention, however, the gearing 24 is located in the machinery space, and it is interposed between the power machinery and the shafting, and, in this form of our invention, we desire to distinguish the gearing from the shafting, both of which heretofore have been included within the expression "transmission means." In this form of our invention, the propeller 8 has its shaft 26 extending forward directly coupled to the shafting 7, and the large gears 24 are mounted directly upon a section of the shafting 7. Said large gears 24 are, as in forms 1 to 6, inclusive, driven by the pinions 23 but carried by a short shaft 42 journaled in bearings 43 on the floor of the machinery space. The short shaft 42 has a bevel pinion meshing with a bevel gear 44, in turn meshing by circumferential gear teeth with the pinion 21 of the low pressure turbine 15, said bevel pinion also meshing with the bevel pinion 45, which meshes by circumferential teeth with the pinion 20 of the high pressure turbine 14. The gears 44 and 45 are suitably journaled on the floor of the machinery space 9. In this form of our invention, wherein the high pressure and low pressure turbines are arranged athwartships in the small machinery space, the gearing 23—24—42 is interposed between the power machinery and the shafting, and is directly connected to both, so that a direct and powerful drive is produced from either the high or low pressure turbines to the shafting and from the shafting to the propeller. Unlike the other forms of our invention, it may be found necessary in the form of our invention of Figs. 13 to 15, inclusive, to construct a center line alley or housing 46 from the machinery space to the after peak into which the propeller shaft extends on the normal hold bottom 2, instead of under or below the latter. The alley or housing 46 will contain the shafting 7, bearings 11 and couplings 12 and will terminate at the after peak bulkhead 3ª, which is arranged opposite the aftermost hold bulkhead 3, so as to provide a space 27 in continuity with the space through the alley or housing 46 for exit and entrance of the engineer, which space 27 may be a ladder trunk, or in the space a ladder may be provided for ingress or egress, the same as in Figs. 1 to 3, inclusive.

In Figs. 16 to 18, inclusive, our invention is shown embodied in a twin-screw vessel of the type shown in Figs. 4 to 6, inclusive, modified to incorporate our invention, as illustrated in Figs. 13 to 15, inclusive, so that identical reference characters, where possible, as employed in Figs. 13 to 15, will be also employed in Figs. 16 to 18, and the same holds true with reference to Figs. 4 to 6, inclusive, when similar parts are referred to or shown. In this form of our invention, the shafting 7, bearings 11 and couplings 12 are extended in bilge tunnel 47, that is, tunnels arranged at or near the bilge, and constructed in accordance with our invention, as disclosed in our United States Patent #1,118,956, granted Dec. 1, 1914. The shafting extends from the machinery space 9 to the after peak where it is coupled directly to the propeller shafting 26. The shafting 7 is also directly geared by the large gears 24 to the high and low pressure turbines, respectively, located in the machinery space. As in the form of our invention shown in Figs. 13 to 15, inclusive, the gears 24 are carried on extensions of shafting 7 and mesh with pinions 23 mounted in bearings 43 on the floor of the machinery space, and the shafts 42 thereof gear, respectively, with the driving pinions 20—21 of the high pressure turbine 14 and low pressure turbine 15, respectively, in manner similar to that indicated in Figs. 13 to 15, inclusive. Thus, in a twin-screw vessel, the gearing is disposed in the machinery space 9 in intimate coöperative relation to the turbines, and forms a direct connection between the turbines and shafting, respectively.

From the foregoing detailed description, it will be seen that we have provided a method and system of means of disposing of the power machinery, gearing and shafting for driving the propellers of vessels which bring about economies in the construction of the vessel, provide for economy of maintenance, increase the cubic carrying capacity of the vessel for a vessel of given dimensions, provide for transmision of power to the propellers, and remove the usual obstructions caused by shafting and tunnels in the after cargo holds, thereby further adding to the vessel's cubic capacity, and enable various types of motor power to be employed without crowding the engine room or machinery space, which latter is much reduced in volume as compared with existing methods of arranging propelling machinery in vessels. Additionally, we have provided novel features of construction in ships for housing and protecting the transmission shafting, have provided for a direct and efficient drive from the engines to the transmission shafting and from the latter to the propellers; and have provided means by which any desired ratio of speed between the "power machinery" and the propellers can be obtained, that is, high speed "power machinery" may be geared down to comparatively low speed propeller drive, which is a very important factor in modern ships. The "transmission means" can be selected with reference to the "power machinery," so as to bring about any desired ratio of speed between the latter and the propellers, and insure strength, power, economy and efficiency, and produce maximum speed of the vessel.

Having thus described our invention, what we claim and desire to secure by Letters Patent is:

1. In combination with a ship having an unobstructed hold bottom and beneath the same a shaft alley; a transmission shaft arranged in and extending along said alley; an engine or machinery space at the forward end of the alley; a prime mover installed in said space; means coupling the prime mover with the transmission shaft; a propeller fitted at the stern of the vessel and having its shaft extended into the after peak; and gearing between the propeller shaft and the transmission shaft whereby to drive the propeller at predetermined speed.

2. In combination with a vessel having its hold flooring entirely unobstructed or unbroken by projections or fixtures extending therefrom; a shaft alley or conduit formed below the said hold flooring and extending from the machinery space of the vessel to the after peak; shafting extending within said alley and emerging at its opposite ends in the after peak and machinery space; a propeller fitted at the stern of the vessel and having its shaft extending into the after peak; gearing mounted on the propeller shaft within the after peak; pinions mounted on the shafting and meshing with said gearing; and power machinery installed in the machinery space and geared to the said shafting to drive the same.

3. In combination with a ship having its normal hold bottom unobstructed, an alley formed below the said normal hold bottom and extending from the machinery space to the after peak; a propeller fitted at the stern of the vessel and having its shaft extended into the after peak; shafting extending along said alley; gearing between the shafting and the propeller shaft for driving the latter; power machinery for driving the shaft disposed in the machinery space and arranged with its axis at an angle to the shafting; and gearing between said power machinery and the shafting.

4. In the combination recited in claim 3, the power machinery comprising high pressure and low pressure turbines, and gearing between the shafting and the said turbines, respectively, whereby one or both of said turbines may drive the shafting.

5. In combination with a ship having its normal hold bottom entirely unobstructed and extending from the machinery space to the after peak, a plurality of alleys formed fore and aft of the vessel below said hold bottom and extending from the machinery space to the after peak; a cross passage below said hold bottom connecting the said alleys at the after peak, said cross passage having an exit at the deck of the vessel; shafting arranged in the respective alleys and extending from the machinery space to the after peak; propellers fitted at the stern of the vessel and having their shafts extending, respectively, into the after peak; gearing between the propeller shafts and shafting, respectively, whereby the propellers are individually driven; power machinery for driving the shafting comprising independent power elements arranged at an angle to the shafting in the machinery space; and gearing between said power machinery and the respective shafting whereby to drive the latter and the propellers.

6. A ship having its normal hold bottom entirely unobstructed, and formed below said hold bottom with an alley extending from the machinery space to the after peak; a propeller fitted at the stern of the vessel and having its shaft extending into the after peak; power machinery arranged in the machinery space; and connections between said power machinery and the propeller shaft, whereby the latter may be driven from the power machinery, said connections extending from the machinery space through the alley and into the after peak.

7. In combination with a ship having a machinery space and after peak, high speed power machinery in the said space; a propeller fitted in the stern of the ship and having its shaft extended into the after peak; and transmission means between the power machinery and the propeller shaft, including gearing adapted to reduce the high speed of the power machinery to a predetermined low speed of the propeller shaft.

8. In combination with a ship having a machinery space and after peak, power machinery in said space; a propeller fitted in the stern of the ship and having its shaft extended into the after peak; and transmission means between the power machinery and the propeller shaft, including gearing adapted to produce between the propeller shaft and the power machinery a predetermined speed ratio.

9. In combination with a ship having a machinery space and after peak, and its hold bottom entirely unobstructed, alleys formed below said hold bottom along the center line of the ship and in the wings adjacent the bilge and extending from the machinery space to the after peak and entering the latter so as to form a continuous passage from one alley to another; power means in the machinery space; transmission means in each of the alleys; propellers fitted in the stern of the vessel and having their shafts extended into the after peak; gearing between the power machinery and transmission means, respectively; and gearing between the latter and the propeller shafts, respectively.

10. A ship having a machinery space and after peak, and having a housing for shafting; a propeller fitted at the stern of the vessel and having its shaft extending into the after peak; power machinery arranged in the machinery space; connections between said power machinery and the propeller shaft, including gearing and shafting, whereby the propeller may be driven from the power machinery; said shafting extending from the machinery space to the after peak within said housing.

11. The system of means for economizing space in ships and driving the propellers thereof comprising forming a comparatively narrow machinery space athwartships; providing a fore and aft alley or housing extending from the machinery space to the after peak; arranging the power machinery in the machinery space at an angle to the longitudinal center line of the ship; fitting a propeller in the stern of the vessel with its shaft extending into the after peak; and providing transmission means between the power machinery and the propeller shaft, the shafting of which extends through the alley or housing fore and aft of the vessel.

12. The method described for economizing space in ships and driving the propellers thereof comprising forming a comparatively narrow machinery space athwartships, connecting said space with the after peak by a fore and aft alley or housing, and thus providing a continuous passage from one to the other, arranging the power machinery in the machinery space at an angle to the longitudinal center line of the ship, fitting the propeller in the stern of the ship with its shaft extending into the after peak, and providing transmission means between the power machinery and the propeller shaft, the shafting of which extends through the alley or housing fore and aft of the vessel.

13. The method described for economizing space in ships and driving the propellers thereof comprising forming a comparatively narrow machinery space athwartships, providing a fore and aft alley beneath the normal hold of the vessel and extending from the machinery space to the after peak; arranging the power machinery in the machinery space at an angle to the longitudinal center line of the ship; mounting a propeller with its shaft extending forwardly into the after peak; and providing transmission means between the power machinery and the propeller shaft and extending the same through the said alley fore and aft of the vessel.

14. A system of means for economizing space in ships and for driving the propellers thereof, the same comprising a comparatively narrow machinery space extending athwartships; an after peak; a fore and aft alley extending from the machinery space to the after peak entirely below the normal hold bottom of the vessel or floor of the hold; power machinery disposed in the machinery space at an angle to the fore and aft alley; a propeller fitted in the stern of the vessel and having its shaft extending forwardly into the after peak; and transmission means between the power machinery and the propeller shaft and extending through the alley and wholly inclosed thereby.

GEORGE SIMPSON.
JOHNSTON R. GORDON.